(12) United States Patent
Akiba et al.

(10) Patent No.: US 7,848,776 B2
(45) Date of Patent: Dec. 7, 2010

(54) DUAL MODE COMMUNICATION SYSTEM, DUAL MODE COMMUNICATION METHOD AND DUAL MODE COMMUNICATION USER EQUIPMENT

(75) Inventors: Takanobu Akiba, Kawasaki (JP); Osamu Yamano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 693 days.

(21) Appl. No.: 11/189,920

(22) Filed: Jul. 27, 2005

(65) Prior Publication Data

US 2006/0223465 A1 Oct. 5, 2006

(30) Foreign Application Priority Data

Mar. 29, 2005 (JP) ............... 2005-096216

(51) Int. Cl.
*H04M 1/00* (2006.01)
*H04B 1/38* (2006.01)
*G08C 17/00* (2006.01)

(52) U.S. Cl. ............... 455/552.1; 370/311; 455/550.1; 455/574

(58) Field of Classification Search ......... 455/130–552, 455/127.4–127.5, 574; 370/252–401; 320/107–134
See application file for complete search history.

(56) References Cited

U.S. PATENT DOCUMENTS

| | | | |
|---|---|---|---|
| 6,275,712 B1 | 8/2001 | Gray et al. | |
| 6,597,911 B1 | 7/2003 | Kransmo | |
| 6,731,957 B1 | 5/2004 | Shamoto et al. | |
| 2002/0187784 A1* | 12/2002 | Tigerstedt et al. | 455/439 |
| 2004/0018853 A1* | 1/2004 | Lewis | 455/552.1 |
| 2004/0048589 A1* | 3/2004 | Yamamoto et al. | 455/130 |
| 2004/0266435 A1* | 12/2004 | de Jong et al. | 455/436 |
| 2005/0059400 A1 | 3/2005 | Jagadeesan et al. | |
| 2005/0064896 A1 | 3/2005 | Rautiola et al. | |
| 2005/0266880 A1* | 12/2005 | Gupta et al. | 455/557 |

(Continued)

FOREIGN PATENT DOCUMENTS

EP 0 896 493 A2 2/1999

(Continued)

OTHER PUBLICATIONS

European Partial Search Report dated Aug. 13, 2008 for corresponding EP Application No. 08154422.3.

(Continued)

*Primary Examiner*—Huy Phan
*Assistant Examiner*—Kathy Wang-Hurst
(74) *Attorney, Agent, or Firm*—Fujitsu Patent Center

(57) ABSTRACT

A dual mode communication system, with user equipment selectively connectable to a plurality of communication systems, for switching communication systems to which the user equipment should be connected, detects that the remaining battery level fell below a first threshold in the user equipment communicating over the W-CDMA system. In the system it is determined whether or not the user equipment can communicate using the GSM system, which can be operated with lower power consumption than the W-CDMA system. When it is determined that communication can be established with the GSM system, the system switches from a connection between the user equipment and the W-CDMA system to a connection between the user equipment and the GSM system without interrupting the communication over the W-CDMA.

17 Claims, 15 Drawing Sheets

U.S. PATENT DOCUMENTS

2006/0079268 A1* 4/2006 Livet et al. .................. 455/522

FOREIGN PATENT DOCUMENTS

| EP | 1024676 | | 8/2000 |
|---|---|---|---|
| EP | 0 896 493 | A3 | 8/2002 |
| EP | 1331832 | | 7/2003 |
| GB | 2 386 504 | A | 9/2003 |
| JP | 0 896 493 | A2 | 8/1998 |
| JP | A 11-252006 | | 9/1999 |
| JP | 2000-069107 | | 3/2000 |
| JP | 2000-232683 | A | 8/2000 |
| JP | 2002-208870 | | 7/2002 |
| JP | 2003-163966 | | 6/2003 |
| JP | 2005-26878 | A | 1/2005 |
| JP | 2005-519562 | A | 6/2005 |
| JP | 2006-500802 | | 1/2006 |
| WO | WO-98/38828 | | 9/1998 |
| WO | WO-01/52567 | | 7/2001 |
| WO | WO-2004/017551 | | 2/2004 |

OTHER PUBLICATIONS

European Search Report dated Dec. 16, 2009 for corresponding EP Application No. 08154422.3.

"Japanese Office Action" mailed by JPO and corresponding to Japanese Application No. 2005-096216 on Apr. 13, 2010, with English translation.

* cited by examiner

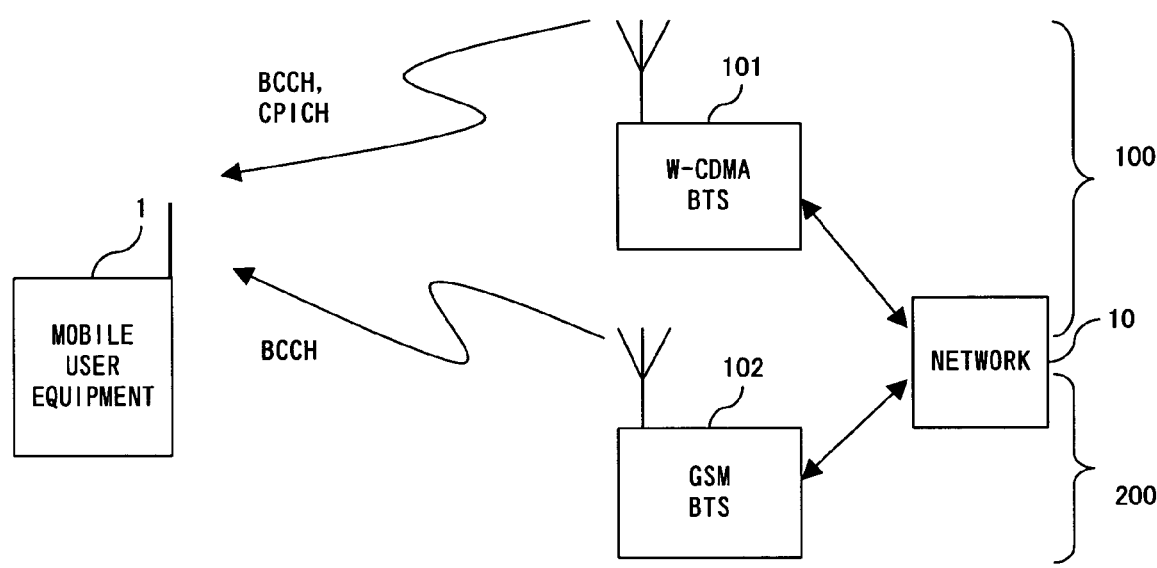
F I G. 1

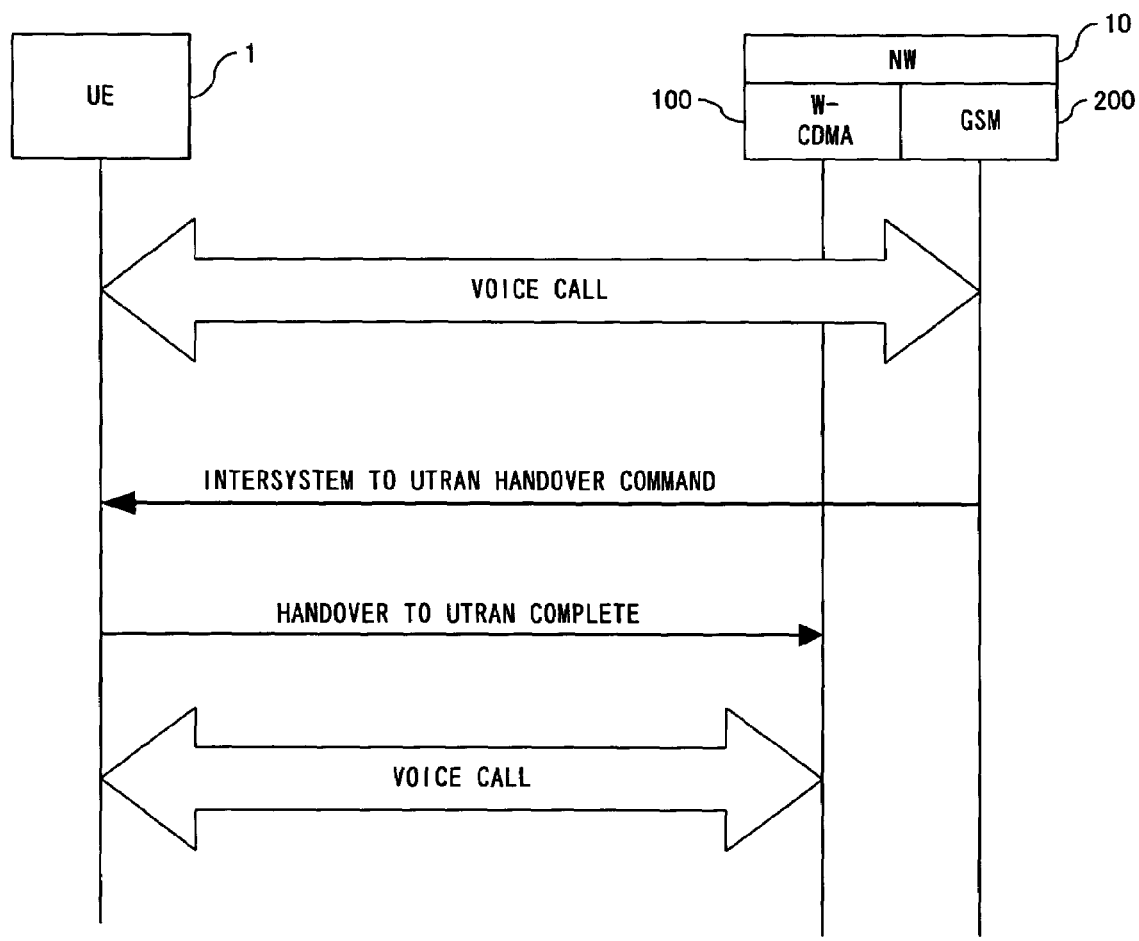
F I G. 4

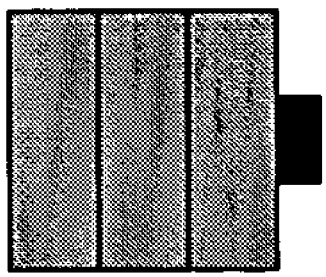
BATTERY IN FULLY
CHARGED STATE
HIGH LEVEL = 3
F I G. 5 A

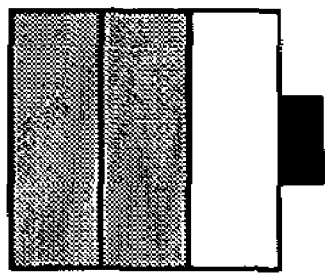
F I G. 5B

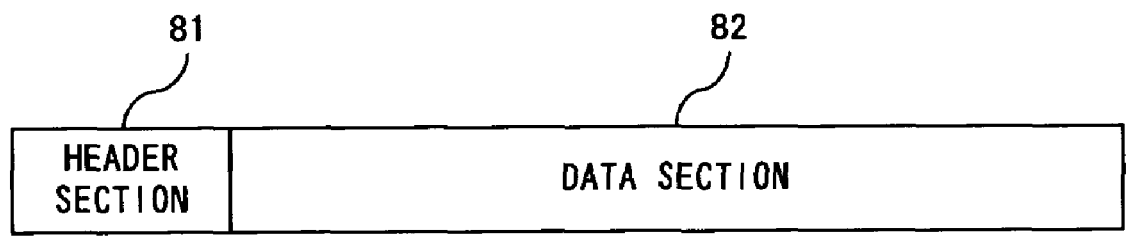
F I G. 8

DUAL MODE COMMUNICATION SYSTEM, DUAL MODE COMMUNICATION METHOD AND DUAL MODE COMMUNICATION USER EQUIPMENT

BACKGROUND OF THE INVENTION

1. Field of the Invention

The present invention relates to a technology for selecting a communications system to be used and switching from system to system among a plurality of different communications systems.

2. Description of the Related Art

Construction of communications infrastructure is in progress at present, and there are a plurality of systems such as W-CDMA (Wideband CDMA), CDMA2000 (Wideband CDMA one) as third generation mobile communication systems, which are becoming the mainstream among wireless communication systems. These communication systems allow high-speed and high-capacity communication; however the power consumption of mobile communication terminal user equipment (hereinafter referred to as user equipment) such as cellular phones is higher than user equipment of the conventional communication systems such as second generation mobile communication systems etc.

Currently, user equipment in general has a function for detecting the remaining battery level and, when the remaining battery level falls below a prescribed level, for notifying a user possessing the equipment of the low battery level by an alarm sound etc. However, in the case that the alarm sounds while the user equipment is in use, if it were during a voice call, for example, the call would be interrupted in several tens of seconds. In other words, although the user equipment has such a function, its alarm does not sound until the remaining battery level falls below the level insufficient to continue the call, and therefore, communication cannot be maintained with the user equipment. The user equipment, the call of which was terminated due to battery discharge, cannot be used for communication until its battery is recharged.

Technologies, which allow the battery power consumption of mobile communication user equipment to be controlled as soon as possible while maintaining communication quality to some extent, are proposed (for example, Patent Document 1). According to such technologies, the communication speed of mobile communication terminal user equipment is switched depending on the remaining battery power, and as the remaining battery level falls, the communication speed is reduced so as to extend the battery lifetime for communication.

There are other technologies proposed in which mobile communication terminal user equipment can selectively switch the communication system to use depending on the communication environment (Patent Documents 2, 3 and 4). According to such technologies, switching between W-CDMA and GSM (Global System for Mobile Communication) is performed, for example, in such a way that W-CDMA, which allows high-speed communication, is used when the remaining battery level is high, and can be switched to the battery-friendly GSM when the battery level is low.

Patent Document 1: Japanese laid-open disclosure public patent bulletin No. 2000-69107 (abstract, FIG. 4, and paragraph 0009)

Patent Document 2: Japanese laid-open disclosure public patent bulletin No. 011-252006 (abstract, FIG. 2, FIG. 4 and paragraph 0015)

Patent Document 3: Japanese laid-open disclosure public patent bulletin No. 2002-208870 (abstract, FIG. 1, and paragraphs 0038-0039)

Patent Document 4: Japanese laid-open disclosure public patent bulletin No. 2003-163966 (abstract, FIG. 1 and paragraph 0015)

As explained above, although one communication system among a plurality of communication systems can be selected and be switched to, the conventional art is not such that an optimum communication system can be automatically selected during a voice call. That is, in the conventional art, when the remaining battery level of the user equipment falls, the call has to be disconnected once, and the user is required to resume communication after switching communication systems to the one requiring less power consumption by manual operation. Such a case is troublesome in that the call has to be disconnected once and, in addition, resuming the communication disconnected once requires heavy battery consumption; therefore, efficiency in the use of the battery itself is reduced and, in some cases, the call cannot be resumed.

The user equipment described in the above Patent Document 2 comprises a function for selecting an optimum system in call request (at the beginning of a call). However, the user equipment only outputs an alarm sound when the battery level falls during a call.

SUMMARY OF THE INVENTION

It is an object of the present invention to provide a communication technology, of a mobile communication system, for enhancing user operation and for extending the user equipment up-time.

In order to solve the above problems, the present invention employs a dual mode communication method or system, in which dual mode user equipment switches between communication systems to which it is connected, when the remaining battery level is detected to have fallen below a first threshold in the user equipment during communication over a first communication system, determining whether or not the user equipment is able to communicate using a second communication system, which can be operated with lower power consumption than the first communication system, and switching a connection between the user equipment and the first communication system to a connection between the user equipment and the second communication system, when it is determined that communication can be established over the second communication system.

When the remaining battery level of the user equipment falls below a first threshold during communication over the first communication system, whether or not handover to the second communication system requiring less power than the first communication system is possible is determined, and if it is possible, handover to the second communication system is performed. In other words, when the remaining battery power becomes low during a voice call, automatic handover to a communication system, which can operate with lower power consumption can be performed maintaining the voice call.

It is possible that the user equipment, if communication can be established over the second communication system, transmits a message requesting a switch from the first communication system to the second communication system, and a handover control system configured on a network switches from the connection between the user equipment and the first communication system to the connection between the user equipment and the second communication system according to the message. Or it is also possible that the user equipment, if communication can be established over the second communication system, transmits measurement information, indicating that the signal level information from the second communication system is higher than the signal level information from the first communication system, to a network, and a handover control device, configured on the network, switches from the connection between the user equipment and the first communication system to a connection between the user equipment and the second communication system, according to the measurement information.

When detecting that the remaining battery level of the user equipment, during communication over the second communication system, rises to or above a second threshold, the connection between the user equipment and the second communication system can be switched to a connection between the user equipment and the first communication system. In such a case, the communication over the first communication system, used before the handover to the second communication system, is resumed when the remaining battery level is recovered by charging etc.

The present invention is not limited to the above dual mode communication method or system. The present invention should be construed as including mobile communication user equipment, network systems and so on, which adopt the above communication method or system.

According to the present invention, a communication system to which user equipment, during a voice call, should connect is switched automatically depending on the remaining battery power, and thus user equipment up-time can be extended enhancing user operation.

BRIEF DESCRIPTION OF THE DRAWINGS

FIG. 1 is a diagram explaining a usage pattern of dual mode mobile user equipment;

FIG. 4 is a handover sequence from the GSM system to the W-CDMA system;

FIG. 5A is a display example (1) of the remaining battery level on the screen of the user equipment;

FIG. 5B is a display example (2) of the remaining battery level on the screen of the user equipment;

FIG. 8 is an example of measurement report;

DESCRIPTION OF THE PREFERRED EMBODIMENTS

Figure 2:
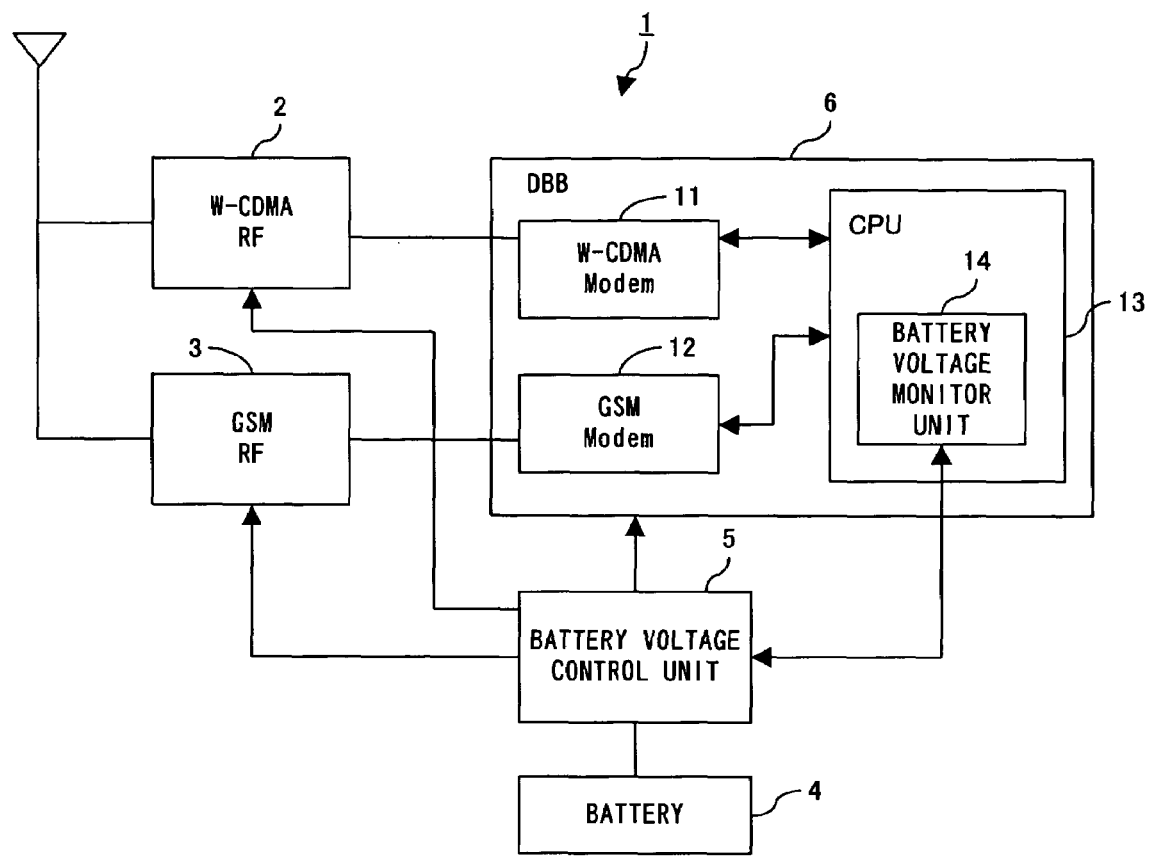
FIG. 2 is a block diagram of the dual mode user equipment relating to the present invention.

In the following description, details of the preferred embodiment of the present invention are set forth with reference to drawings.

FIG. 1 is a diagram explaining a usage pattern of dual mode mobile user equipment. The dual mode mobile user equipment is terminal equipment, which can be selectively connected to a plurality (usually two) of communication systems, and can perform communication with the other user equipment using the selected communication system.

In the example in FIG. 1, the dual mode mobile user equipment 1 (hereinafter called "user equipment" on occasion) connects to either a W-CDMA system 100 adopting a W-CDMA method or a GSM system 200 adopting a GSM method, and performs communication with the other user equipment. A BTS (Base Transceiver System) 101 of the W-CDMA communication 100 and a BTS 102 of the GSM system 200 transmit a BCCH (Broadcast Channel) or a CPICH (Common Pilot Channel) signal to user equipment located within the service area of each BTS repeatedly at a prescribed time interval. The user equipment 1, based on the BCCH or the pilot signal received from the BTS 101 and the BTS 102, recognizes the state of each network and determines a communication system to be connected to in performing communication. For example, when signal level of the BCCH from the BTS 101 of the W-CDMA system 100 is higher than a predetermined level, and signal level of the BCCH from the BTS 102 of the GSM system 200 is lower than a predetermined level, the user equipment 1 selects the W-CDMA system 100 and performs communication over the BTS 101.

A network 10 is connected to both of the BTS 101 of the W-CDMA system and the BTS 102 of the GSM system 200. That is, the network 10 provides a function for transferring signals between the W-CDMA system 100 and the GSM system 200. In addition, the network 10 comprises a handover control system, not shown in the figures, for controlling handover between the W-CDMA system 100 and the GSM system 200.

FIG. 2 is a block diagram of the dual mode user equipment 1 relating to the present invention. The user equipment 1 comprises a W-CDMA radio frequency unit 2, a GSM radio frequency unit 3, a battery 4, a battery voltage control unit 5 and a digital baseband unit 6. The W-CDMA radio frequency unit 2 and the GSM radio frequency unit 3 transmit/receive radio signals to/from the communication system 100 and the communication system 200, respectively. The battery 4 is a rechargeable secondary battery. The battery voltage control unit 5 converts the output voltage of the battery 4 into voltages that each of the circuit units (the W-CDMA radio frequency unit 2, the GSM radio frequency unit 3, and the digital baseband unit 6) require. The digital baseband unit 6 comprises a W-CDMA modem 11, a GSM modem 12 and a CPU (Central Processing Unit) 13, and the CPU 13 comprises a battery voltage monitor unit 14. Each of the W-CDMA modem 11 and the GSM modem 12 modulates/demodulates transmitted/received signals over its corresponding communication system. The CPU 13 controls various operations relating to the present invention. The battery voltage monitor unit 14 is connected to the battery voltage control unit 5, and monitors the output voltage of the battery 4 in order to detect the remaining battery level.

Figure 3:
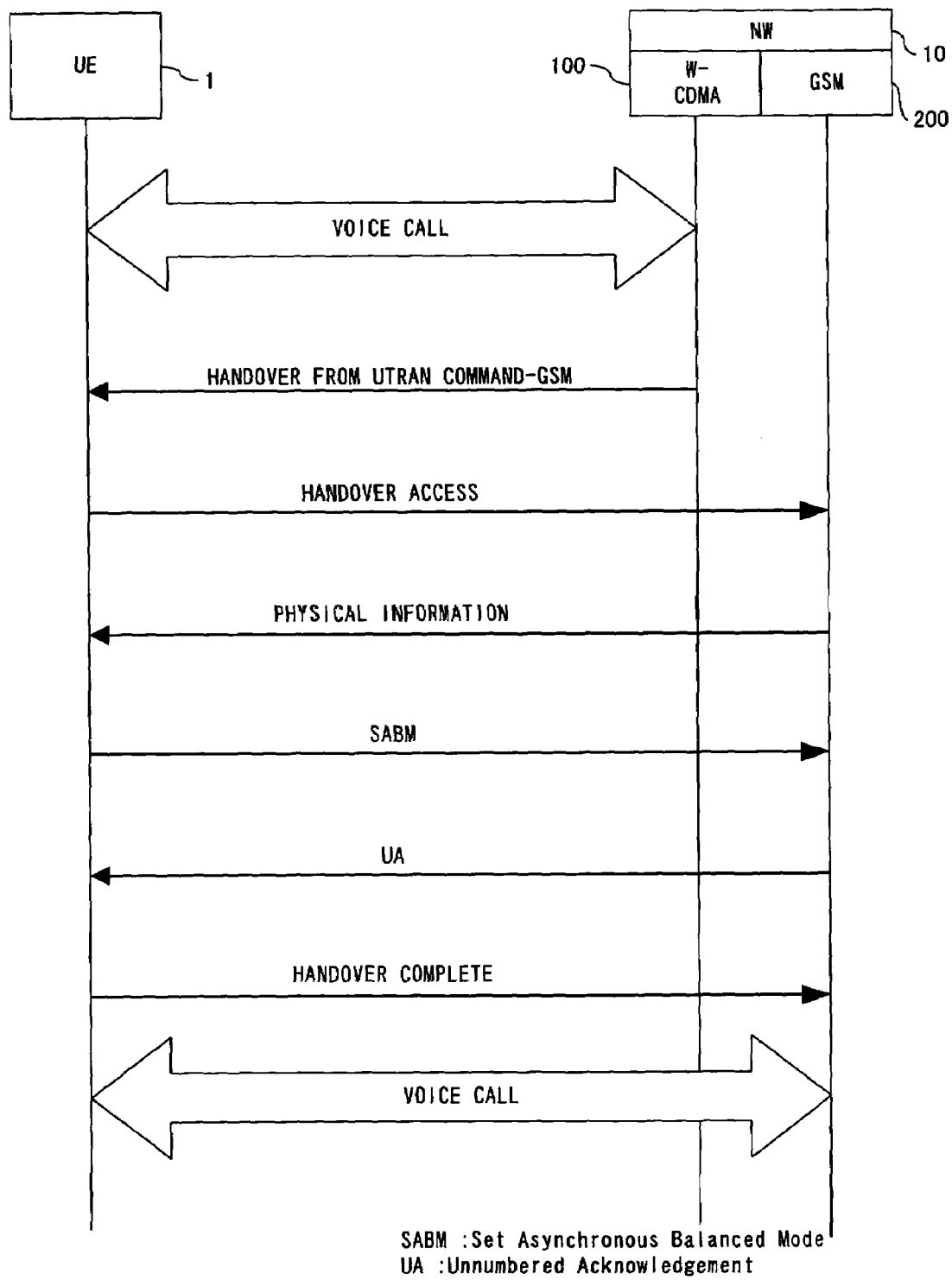
FIG. 3 is a handover sequence from the W-CDMA system to the GSM system.

FIG. 3 is a handover sequence from the W-CDMA system 100 to the GSM system 200. FIG. 4 is also a handover sequence but is from the GSM system 200 to the W-CDMA system 100. In the following description, an explanation of a general handover sequence is provided with reference to FIG. 3 and FIG. 4.

In FIG. 3, UE (User Equipment) 1 was transmitting/receiving voice data over the W-CDMA system 100. Then, handover from UTRAN Command-GSM is transmitted from the W-CDMA system 100 to the UE 1. Due to this command, the UE 1 starts processing for switching its communication system to the GSM system 200. The UE 1, which received the handover from UTRAN Command-GSM, transmits a handover access message to the GSM system 200 of the handover destination. The GSM system 200, upon receiving the handover access message, transmits a physical information message to the UE 1. The physical information message that the UE 1 received from the GSM system 200 contains information related to line status statistics, utilization and so on at that point in time.

The UE 1 having received the physical information message transmits a SABM (Set Asynchronous Balanced Mode) message to the GSM system 200 of the handover destination. In response, the GSM system 200 transmits a UA (Unnumbered Acknowledgement) back to the UE 1. The UE 1, which received the UA, transmits a handover complete message to the GSM system 200, and the handover is completed. Subsequently, the UE 1 continues the call over the GSM system 200 of the handover destination.

In FIG. 4, the UE 1 was transmitting/receiving voice over the GSM system 200. Then, an intersystem to UTRAN handover command message is transmitted from the GSM system 200 to the UE 1. The UE 1, which received the intersystem to UTRAN handover command, transmits a handover to UTRAN complete message to the W-CDMA system 100 of the handover destination. Subsequently, the UE 1 continues the call over the W-CDMA system 100 of the handover destination.

In FIG. 3 and FIG. 4, an example of transmitting/receiving of voice is used for the explanation; however it is not limited to the example. That is, the sequence is, for example, basically the same in handover during packet communication or in handover during data communication.

The above sequence is a standardized technology, which is heretofore known.

The above handover, in general, is performed depending on the neighbor radio wave environment the UE 1. When the UE 1 is performing communication using the W-CDMA system 100, for example, if the signal level of a signal from the BTS 101 of the W-CDMA system 100 becomes weak and the signal level of a signal from the BTS 102 of the GSM system 200 is sufficiently high, handover from the W-CDMA system 100 to the GSM system 200 is performed.

Meanwhile, in the dual mode communication method or system of the present embodiments, handover between the communication systems 100 and 200 is performed depending on the remaining battery power of the UE 1. In the following description, therefore, handover operation, depending on the remaining battery power of the UE 1, is explained. A system relating to the dual mode communication method or system of the present embodiments can also perform handover depending on neighbor radio wave environment the UE 1.

Figure 5C:
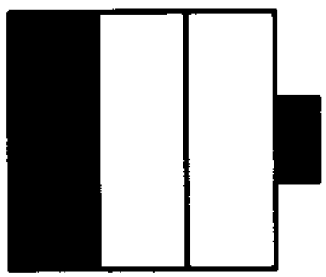
FIG. 5C is a display example (3) of the remaining battery level on the screen of the user equipment.

The remaining battery level is displayed on the screen of the UE 1 so that a user can refer to the battery level. FIG. 5A, FIG. 5B and FIG. 5C are display examples of the remaining battery level on the screen of the UE 1. The remaining battery level is generally displayed in three levels. In the present embodiment, the fully-charged state shown in FIG. 5A is called "level 3"; the half-charged state shown in FIG. 5B "level 2"; and the charge-required state shown in FIG. 5C "level 1".

The UE 1, basically, consumes higher electric power when using the W-CDMA system 100 than when using the GSM system 200. In the present embodiment, therefore, when the remaining battery level falls to the Level 1 while the UE 1 communicates in the W-CDMA system, the system is switched to the GSM system, without interrupting the communication. In other words, handover from the W-CDMA system 100 to the GSM system 200 is performed. By so doing, communication time can be extended reducing power consumption of the UE 1 though the highest communication speed is lower compared with the case that the W-CDMA system is continuously used.

Figure 6:
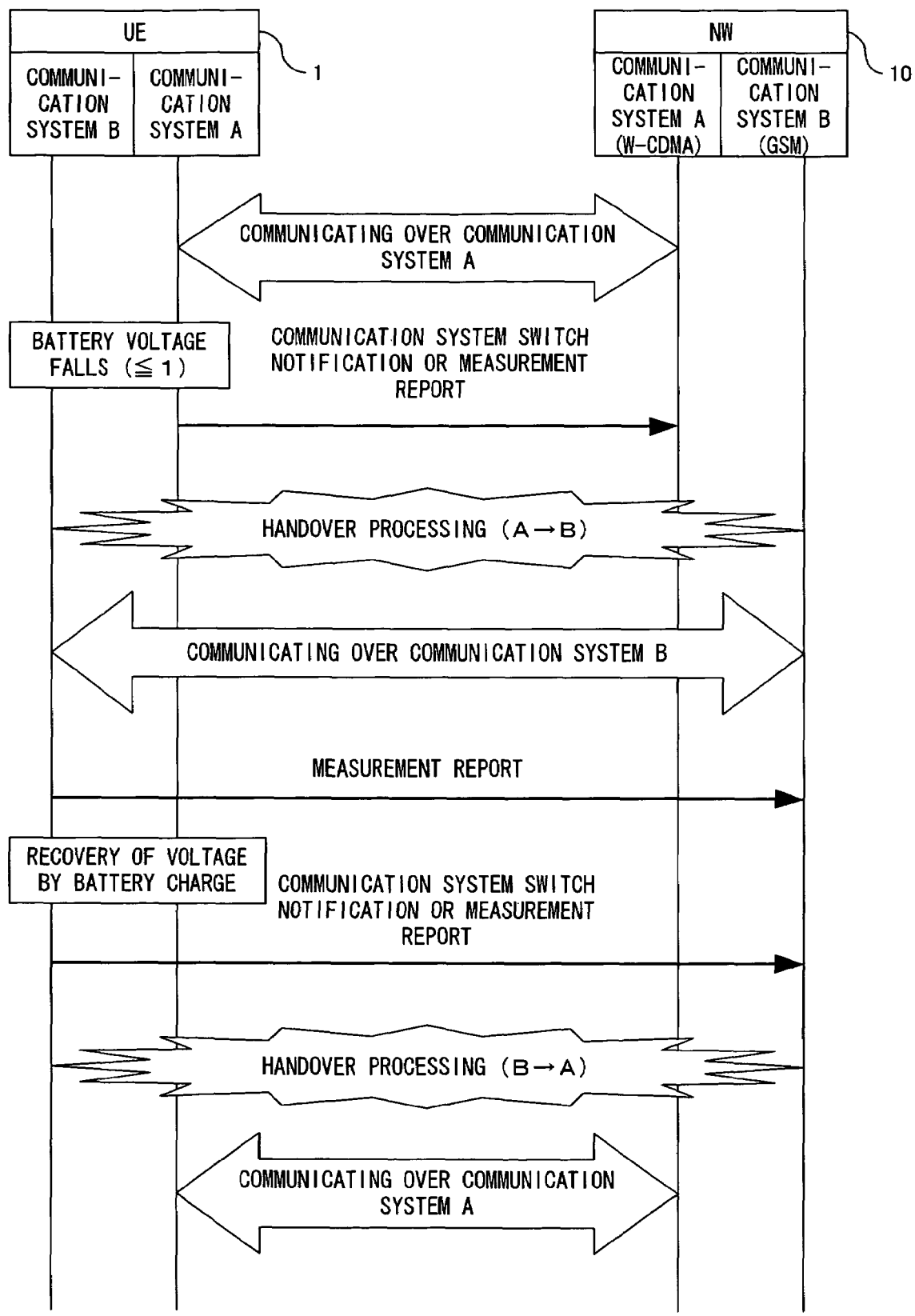
FIG. 6 is a processing sequence of switching between the communication systems relating to the present embodiment.

FIG. 6 is a processing sequence of switching between the communication systems relating to the present embodiment. According to the example in FIG. 6, the user equipment 1 is able to communicate with another user equipment over either of two communication systems A or B. Here, the communication system A provides faster communication service than the communication system B. However, electric power consumption of the UE 1 is higher when using the communication system A than when using the communication system B. The UE 1 performs communication over the communication system A when the remaining battery level is the level 2 or the level 3.

In the present embodiment, the communication system A is the W-CDMA system, for example. For the communication system B, a GSM system, a wireless LAN (wireless Local Area Network), a Bluetooth network, a PHS (Personal Handyphone System) in which the power consumption of the UE 1 is lower than the W-CDMA system, can be used.

Suppose the remaining battery level of the UE 1 communicating with another user equipment over the communication system A fell to the level 1 in FIG. 6. When recognizing the fall of the battery level to the level 1, the UE 1 transmits either a communication switch request message or a measurement report message. The transmitted message is transferred to a handover control system, not shown in the figures, provided in the network 10. In so doing, the handover control system provides instructions to carry out handover from the communication system A to the communication system B, based on the message, to both the communication system A and the communication system B. At that time, the instruction is transmitted to the UE 1 via the communication system A. By so doing, handover from the communication system A to the communication system B is performed, and the UE 1 continues communication over the communication system B thereafter. An explanation of the communication system switch request message and the measurement report message is provided later with reference to FIG. 7 and FIG. 8.

After switching to the communication system B, the UE 1 transmits information required to prevent handover back to the communication system A (that is, information required to maintain the connection to the communication system B), by using the measurement report message transmitted at a prescribed interval, for example.

The UE 1 transmits the communication system switch notification request message or the measurement report message when the remaining battery level returns to the level 2 or higher because of charging the battery or due to other reasons. Then, the handover control system provides instructions to perform handover from the communication system B to the communication system A, to the communication system A, the communication system B and the UE 1. By so doing, the handover from the communication system B to the communication system A is performed, and the UE 1 continues communication over the communication system A thereafter.

Figure 7:
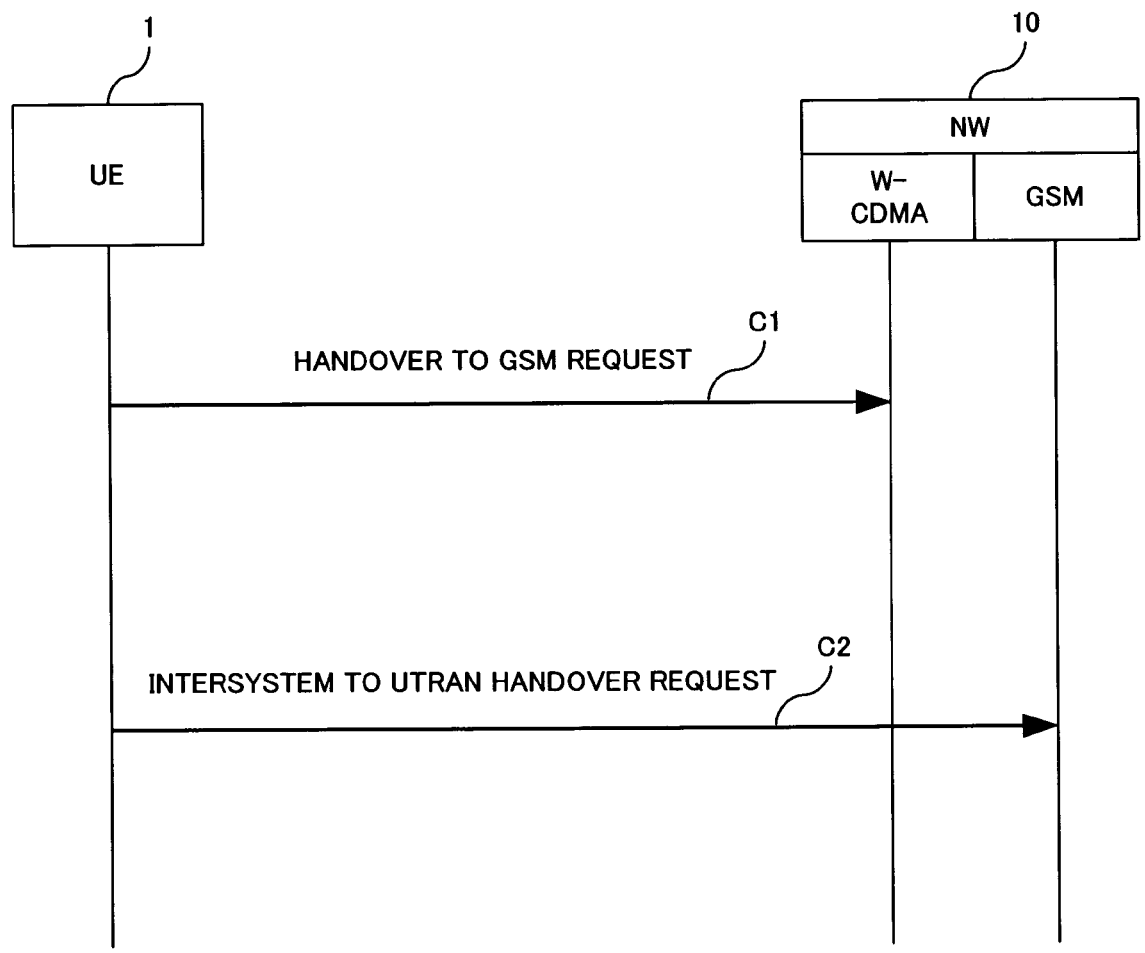
FIG. 7 is an example of the communication system switch request.

FIG. 7 is an example of the communication system switch request. FIG. 7 shows commands transmitted from the UE 1 to the network 10, and a command C1 is an example of a request to switch from the W-CDMA system 100 to the GSM system 200 whereas a command C2 is an example of a request to switch from the GSM system 200 to the W-CDMA system 100. These commands can be transmitted with the other messages or can be transmitted separately.

FIG. 8 is an example of a measurement report. In a header section 81, at least information for identifying the UE 1 and information for indicating the message type (in this example, information indicating measurement report) are stored. In a data section 82, at least, a measurement result of the signal level of signals from the BTS 101 of the W-CDMA system 100 and/or the BTS 102 of the GSM system 200 is stored. For example, the UE 1 measures the signal level information (or propagation loss) of the channel being used, the signal level information of signals of other frequencies in the communication system being used by the UE 1, and the signal level information of a signal in yet another communication system and so forth, and the measurement results are stored in the data section 82.

The handover control system provided in the network 10 determines whether to perform handover or not, according to measurement result information carried by the message. This sequence is realized by a technology, which is heretofore known.

However, the UE 1 of the present embodiment, when requesting a handover in accordance with the fall of the remaining battery level, independently of the actual measurement result, a value higher than the signal level data of a communication system, of the UE 1 with high power consumption, is written in the data section 82 as signal level data of a communication system, of the UE 1 with low power consumption. In the above embodiment, when the remaining battery level of the UE 1 falls to the level 1, information indicating that the signal level information from the GSM system 200 is higher than that from the W-CDMA system 100 is written to the data section 82 and is transmitted to the network 10. In other words, the UE 1 generates measurement information in order to forcibly cause handover, and transmits the measurement information to the network 10. According to the information, the handover control system provided in the network 10 determines whether to perform the handover or not. As a result, the handover from the W-DMA system 100 to the GSM system 200 can be performed regardless of the actual radio wave environment.

In the following description, a specific processing flow of a dual mode communication method or system of the present embodiment is explained with reference to FIG. 9 through FIG. 13.

Figure 9:
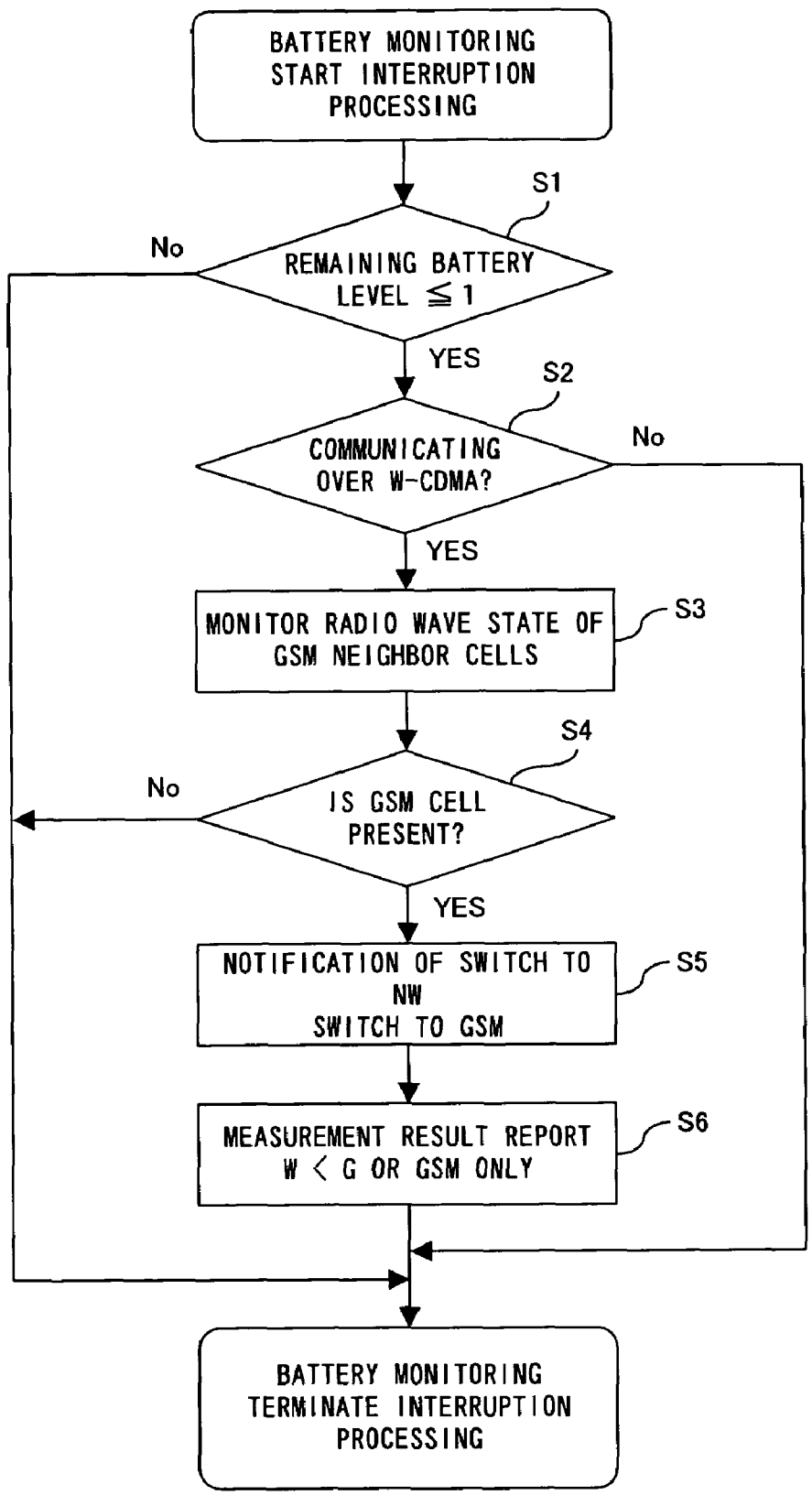
FIG. 9 is a flowchart of system switch processing based on the system switch request.

FIG. 9 is a flowchart of system switch processing based on the system switch request. In this flow, the processing in FIG. 9 is repeatedly performed at a prescribed time interval in the UE 1 during its communication. Processing in FIG. 10 through FIG. 13, explained later, is, also in the same manner, performed at a prescribed time interval.

First, the remaining battery level is determined in step S1. When the battery level is either in the level 2 or the level 3, the processing is terminated. On the other hand, when the battery level is in the level 1, the processing proceeds to the step S2, and it is determined whether or not it is communicating over the W-CDMA system. Then, when communication is performed over a system other than the W-CDMA system, the processing is terminated.

When the UE 1 is communicating over the W-CDMA system, the radio wave intensity of neighbor cells the GSM system 200 is monitored in steps S3 and S4, and it is determined whether or not a GSM cell is detected. When a GSM cell is not detected, the processing is terminated. On the other hand, when any GSM cell is detected, in step S5, a network switch request message is transmitted to the network 10 in order to request handover from the W-CDMA system 100 to the GSM system 200. Due to the request message, handover processing from the W-CDMA system 100 to the GSM system 200 is performed on the network 10 side. In step S6, a measurement report message is transmitted and the processing is terminated.

In the measurement report message transmitted in the step S6, not information indicating the signal level actually measured by the UE 1, but information for the UE 1 to maintain the connection with the GSM system 200 is stored. By so doing, even when the radio wave intensity of the W-CDMA system 100 is in practice higher than that of the GSM system 200, switching back to the W-CDMA system 100 which has higher power consumption can be prevented. More specifically, information indicating that the radio field intensity received from the GSM system 200 is higher than the radio field intensity received from the W-CDMA system 100, or measurement result information of the GSM system 200 alone is included in the measurement report, and is transmitted to the network 10.

As described above, in the procedures shown in FIG. 9, when the remaining battery level falls during communication, a message for directly requesting handover is transmitted from the UE 1 to the network 10. The network 10 performs the handover in response to the message.

Figure 10:
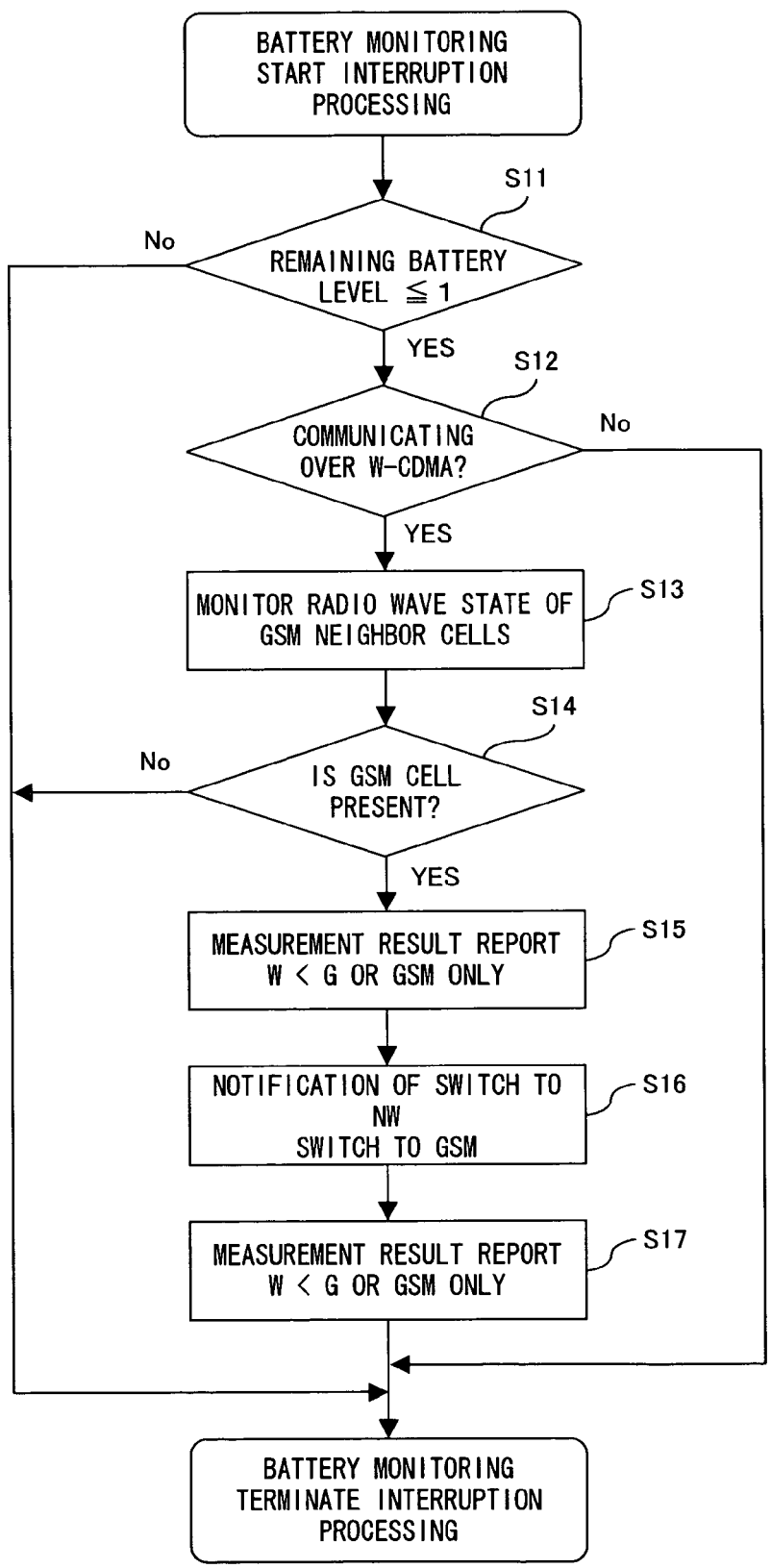
FIG. 10 is a flowchart of system switch processing based on the measurement report.

FIG. 10 is a flowchart of system switching processing based on the measurement report. The processing in step S11 through step S14 is equivalent to the processing in step S1 through step S4 in FIG. 9, and therefore the explanation of the processing is omitted. In the following description, processing, which is different from that of FIG. 9, is explained.

In step S15, the measurement report message is transmitted to the network 10. The measurement report message transmitted stores information used to perform handover from the W-CDMA system 100 to which the UE 1 is connected to the GSM system 200. Specifically, either information, indicating that the signal level information from the GSM system 200 is higher than that from the W-CDMA system 100, or measurement result information of the GSM system alone is set by the UE 1, and is stored in a certain field of the message. In step S16, the network 10, which received the measurement report, performs the handover processing. Processing of step S17 is the same as that of step S6 in FIG. 9.

As described above, in the procedures shown in FIG. 10, fake measurement information to cause handover is generated, and handover is performed based on the measurement information.

Figure 11:
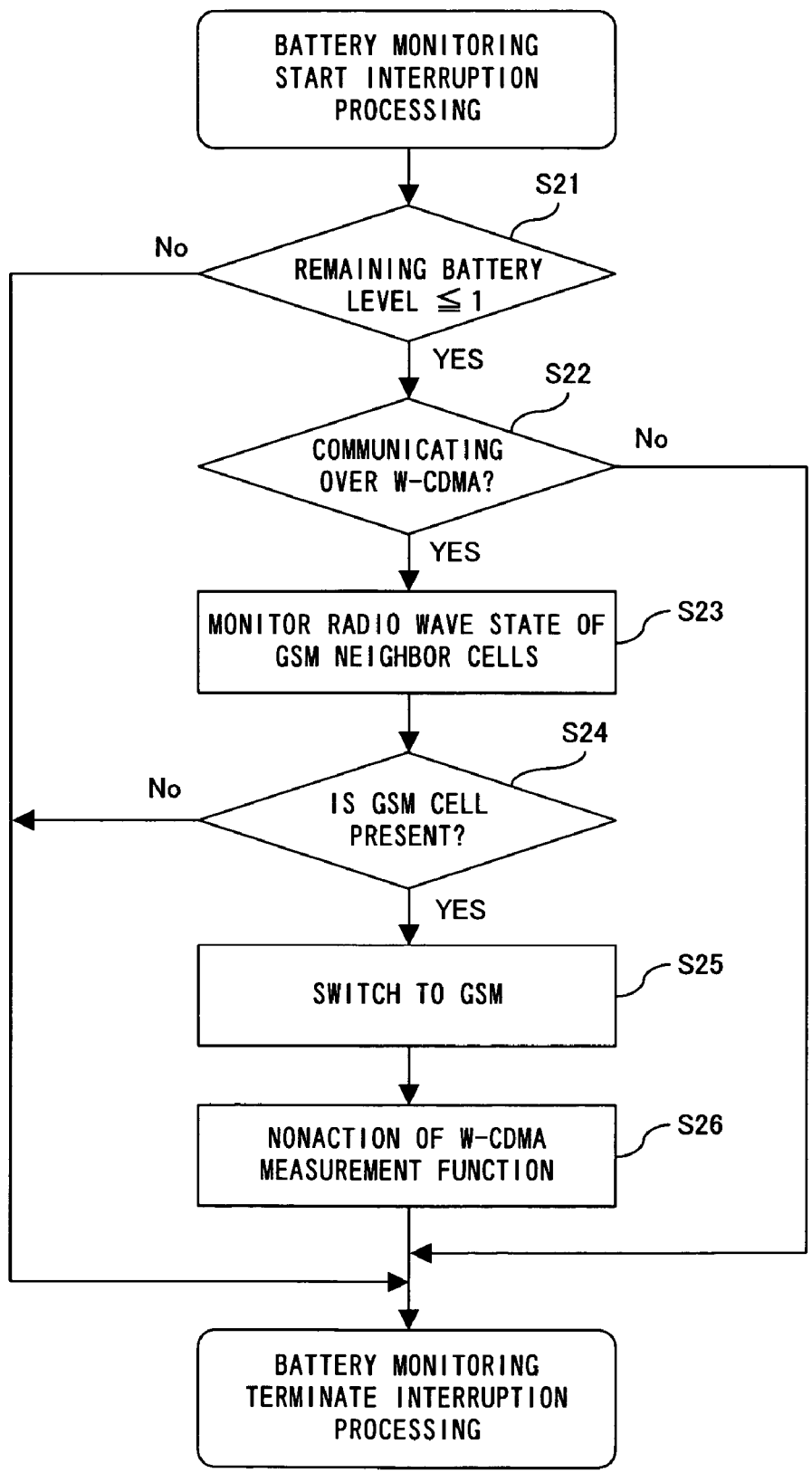
FIG. 11 is a flowchart of other processing in order to prevent the communication system from switching after handover.

FIG. 11 is a flowchart of system switch processing comprising other processing in order to prevent the communication system from switching after handover. In FIG. 11, processes in the step S21 through step S24 are the same as the processes in the step S1 through step S4 of FIG. 9, and thus the explanation of such processing is omitted.

In step S25, switch from the W-CDMA system 100 to the GSM system 200 is performed. This processing is equivalent to that of step S5 in FIG. 9 or that of step 15 and step S16 in FIG. 10.

In step S26, a measurement function in the W-CDMA system is deactivated. By so doing, the signal level information of the W-CDMA system 100 is not transmitted to the network 10, and handover from the GSM system 200 to the W-CDMA system 100 will not be performed even though the actual signal level information from the W-CDMA system 100 is higher than that of the GSM system 200. In other words, communication is maintained in the communication system with lower power consumption.

Figure 12:
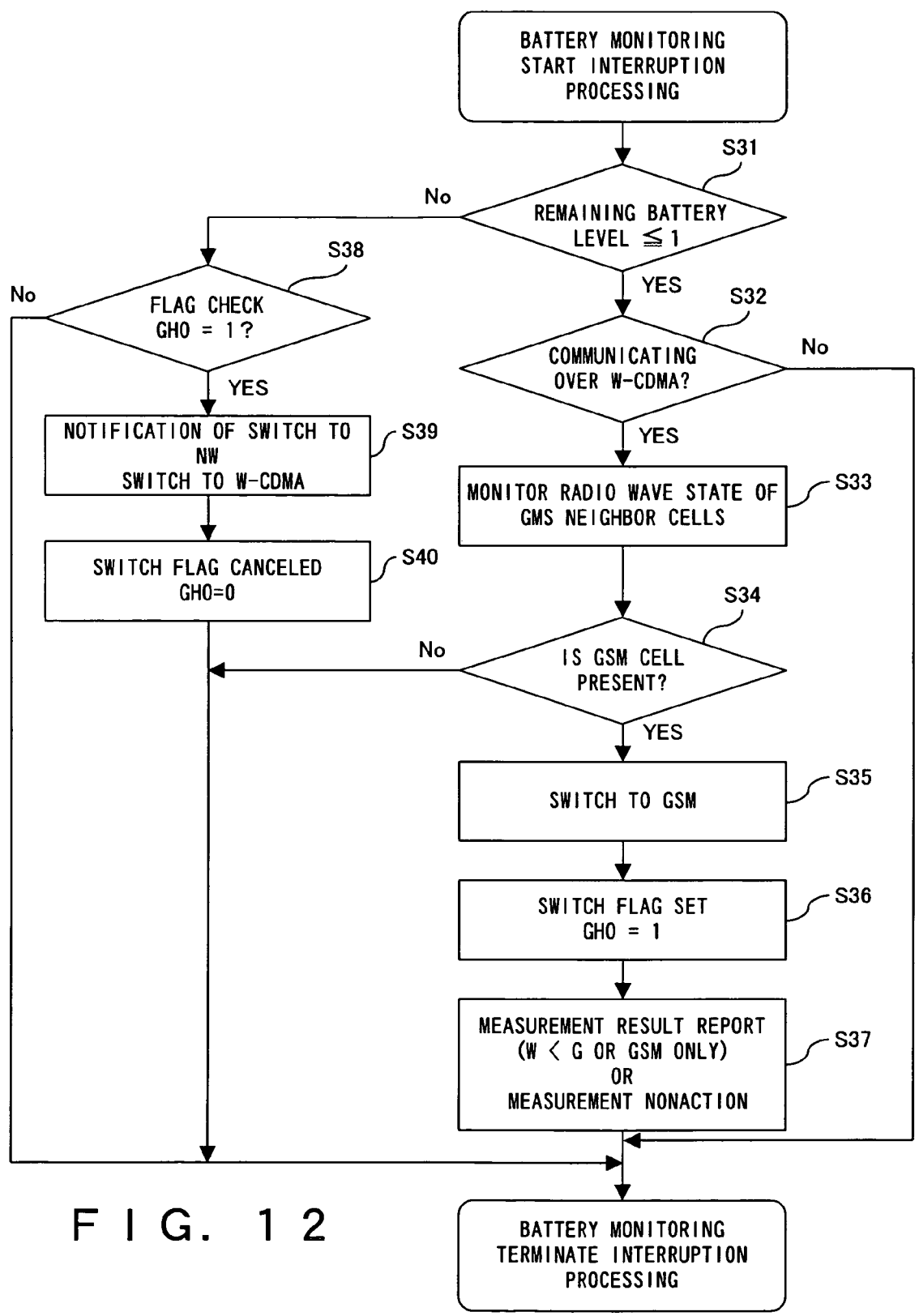
FIG. 12 is a flowchart including return processing by recovery of battery power of the user equipment.

FIG. 12 is a flowchart including return processing by recovery of battery power of the UE 1. In the processing shown in FIG. 12, the processing from step S31 to S37 is mostly the same as of the explanation provided using FIG. 9 through FIG. 11 before. However, processing for setting "1" in a switch flag GHO, which indicates a communication system to which the UE 1 is connected, is added as step S36. The switch flag GHO identifies "1: a state in which the GSM system 200 is used in response to a fall of the remaining battery level" and "0: a state in which the W-CDMA system 100 is used". The switching flag GHO can be also set at the same processing timing as step S36 in processing of FIG. 9 through FIG. 11.

When the battery is charged during communication using the UE 1, the remaining battery level rises from the level 1 to the level 2 and to the level 3 shown in FIG. 5. In such a case, the result of step S31 is determined to be "No", and the processing proceeds to step S38.

Step S38 checks the switch flag GHO. That is, it is determined whether or not switching of the communication systems is performed in accordance with the remaining battery level. When "GHO=0", it is determined that switching of systems in accordance with the battery level is not performed, and the processing is terminated. When "GHO=1", the processing proceeds to step S39.

In step S39, by transmitting the network switch request message to the network 10, handover from the GSM system 200 to the W-CDMA system 100 is requested. At the request, handover processing from the GSM system 200 to the W-CDMA system 100 is performed on the network 10 side. In step S40, the switch flag GHO is canceled (i.e. is set "0"), and the processing is terminated.

Figure 13:
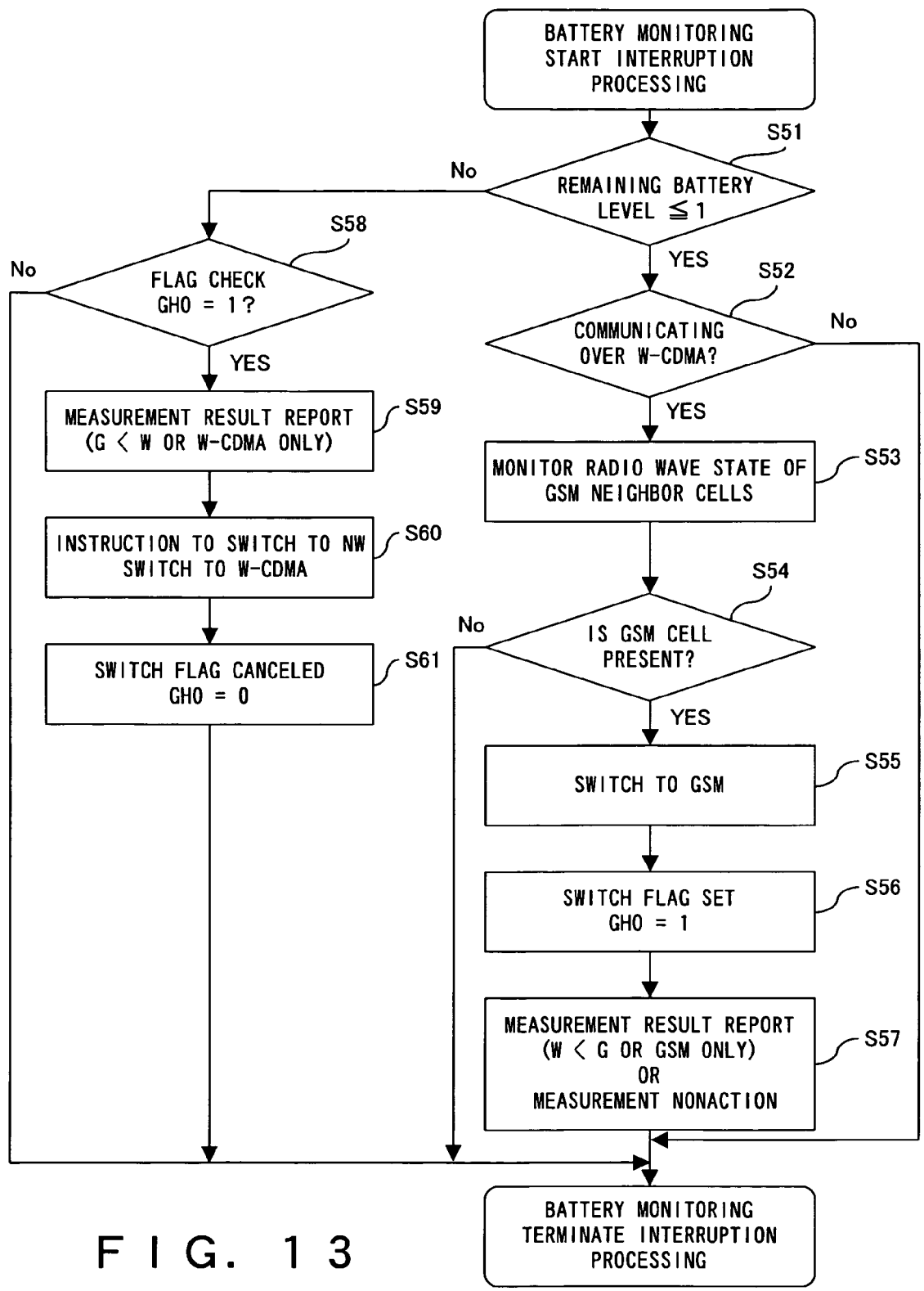
FIG. 13 is a flowchart including other return processing by recovery of battery power of the user equipment.

As described above, after handover from the W-CDMA system 100 to the GSM system 200 is performed in accordance with the remaining battery level, if battery power is recovered during the same communication, communication use of the W-CDMA system 100 is automatically resumed. Thus, when the battery power recovers, high-speed communication service can be provided immediately without interrupting the line. FIG. 13 is a modification of the flowchart shown in FIG. 12. Among processing shown in FIG. 13, steps S51 through S57 corresponds to the steps S31 through S37 in FIG. 12, respectively, and step S58 corresponds to the step S38 in FIG. 12. Thus, explanation of the processing in these steps is omitted.

In step S59, the measurement report message is transmitted to the network 10. The measurement report transmitted stores information for handover of the system to which the UE 1 is connected from the GSM system 200 to the W-CDMA system 100. Specifically, information indicating that the radio field intensity received from the W-CDMA system 100 is higher than the radio field intensity received from the GSM system 200 or information of the W-CDMA system 100 alone is set by the UE 1, and is stored in a prescribed location of the message. In step S60, handover processing is performed, and the UE 1 is connected to the W-CDMA system 100. In step S61, the switch flag GHO is canceled.

As explained above, according to a dual mode communication method or system relating to the present embodiment, when the remaining battery level falls below the prescribed level during communication, handover to a communication system, which reduces electric power consumption of the UE 1 is automatically performed without interrupting communication. Therefore, the battery lifetime for communication after the remaining battery level is low can be extended. At that time, a user does not have to disconnect the communication once and resume the call after switching the communication system to be used, and therefore convenience is improved through the method or system. In addition, because communication disconnection processing and call resumption processing requires relatively high power consumption, elimination of such processing allows further reduction of the power consumption. Moreover, when the remaining battery level recovers to a prescribed level or above, by charging of the UE 1, even if the UE 1 is in the middle of communication, the connected communication system can be automatically switched to a communication system, which enables higher-speed and higher-capacity communication, without disconnecting the communication.

In the above embodiment, the explanations of two communication systems and dual mode user equipment, which can be connected to both communication systems, are provided; however, the present invention is not limited to the above embodiment. In other words, the present invention can be adopted in three or more communication systems and dual mode user equipment connectable to the communication systems. In such a case, depending on the remaining battery power, the communication system to be used is selected so that the optimal balance between communication performance and available communication time period can be attained.

What is claimed is:

1. A dual mode communication method, comprising:
   detecting a remaining battery level that is below a first threshold of a dual mode communication equipment communicating over a first communication system;
   determining whether the dual mode communication equipment is able to communicate using a second communication system, which can be operated with lower power consumption than the first communication system; and
   switching from a connection between the dual mode communication equipment and the first communication system to a connection between the dual mode communication equipment and the second communication system according to measurement information transmitted by the dual mode communication equipment, when determined that communication can be established using the second communication system, the measurement information indicating that a signal level for the second communication system is higher than a signal level for the first communication system even if an actual signal level for the second communication system is lower than an actual signal level for the first communication system.

2. The dual mode communication method according to claim 1, further comprising:
   transmitting from the dual mode communication equipment a message requesting a switch from the first communication system to the second communication system to a network if communication can be established over the second communication system; and
   switching from the connection between the dual mode communication equipment and the first communication system to the connection between the dual mode communication equipment and the second communication system according to the message.

3. The dual mode communication method according to claim 1, further comprising:
   transmitting from the dual mode communication equipment to the second communication system measurement information, the measurement information indicating that a signal level information from the second communication system is higher than a signal level information from the first communication system, to a network; and switching, using a handover control system, configured on the network, from the connection between the dual mode communication equipment and the first communication system to a connection between the dual mode communication equipment and the second communication system, according to the measurement information.

4. The dual mode communication method according to claim 3, further comprising:
continuing to transmit the measurement information to the network from the dual mode communication equipment, when connected to the second communication system, the measurement information indicating that the signal level information from the second communication system is higher than the signal level information from the first communication system.

5. The dual mode communication method according to claim 3, further comprising:
transmitting the measurement information of the second communication system alone to the network from the dual mode communication equipment when the dual mode communication equipment when the dual mode communication equipment is connected to the second communication system.

6. The dual mode communication method according to claim 3, further comprising:
deactivating a measurement function of the first communication system when connected to the second communication system.

7. The dual mode communication method according to claim 1, further comprising:
switching from the connection between the dual mode communication equipment and the second communication system to the connection between the dual mode communication equipment and the first communication system, when detecting that the remaining battery level of the dual mode communication equipment, communicating over the second communication system, rises to or above a second threshold.

8. The dual mode communication method according to claim 7, wherein
the switching from the second communication system to the first communication system is realized by transmitting measurement information to the network, the measurement information indicating that a signal level information from the first communication system is higher than a signal level information from the second communication system.

9. The dual mode communication method according to claim 7, wherein
the switching from the second communication system to the first communication system is realized by transmitting a message requesting switching from the second communication system to the first communication system to the network.

10. A dual mode communication method, comprising:
comparing a remaining battery level of a communication equipment, communicating over a first communication system, with a threshold;
determining whether the communication equipment can communicate using a second communication system, which can be operated with lower power consumption than the first communication system when the remaining battery level falls below the threshold; and
switching from a connection between the communication equipment and the first communication system to a connection between the communication equipment and the second communication system according to measurement information transmitted by the communication equipment, the measurement information indicating that a signal level for the second communication system is higher than a signal level for the first communication system, even if an actual signal level for the second communication system is lower than an actual signal level for the first communication system, independently of an actual signal level, when the communication equipment can establish communication over the second communication system.

11. Dual mode communication equipment, which can be connected to either of a first communication system or a second communication system, the dual mode communication equipment comprising:
a battery;
a detector to detect a remaining level of the battery;
a transmitter to transmit measurement information, the measurement information indicating that a signal level for the second communication system is higher than a signal level for the first communication system, even if an actual signal level for the second communication system is lower than an actual signal level for the first communication system; and
a controller to perform handover from the first communication system to the second communication system, when the remaining battery level falls below a threshold during communication over the first communication system.

12. The dual mode communication equipment according to claim 11, further comprising:
a first communication unit to connect to the first communication system;
a second communication unit to connect to the second communication system with lower power consumption than the first communication system; and
a transmitter to transmit handover information, relating to handover from the first communication system to the second communication system, to the network when the remaining battery level falls below the threshold during communication over the first communication system, and wherein
the controller performs handover following an instruction generated based on the handover information in a handover control system configured on the network.

13. A dual mode communication system, comprising:
a detecting unit to detect that a remaining battery level fell below a first threshold in a dual mode communication equipment communicating over a first communication system;
a determining unit to determine whether the dual mode communication equipment is able to communicate using a second communication system, which can be operated with lower power consumption than the first communication system; and
a switching unit to switch from a connection between the dual mode communication equipment and the first communication system to a connection between the dual mode communication equipment and the second communication system according to measurement information transmitted by the dual mode communication equipment, the measurement information indicating that a signal level for the second communication system is higher than a signal level for the first communication system, even if an actual signal level for the second communication system is lower than an actual signal level for the first communication system, when it is determined that communication can be established using the second communication system.

14. The dual mode communication method according to claim 1, wherein switching includes switching using a hardware control system.

15. The dual mode communication method according to claim 1, wherein the second communication system is a GSM system.

16. The dual mode communication method according to claim 1, wherein the first communication system is a W-CDMA system.

17. The dual mode communication method according to claim 16, wherein the second communication system is a GSM system.

* * * * *